United States Patent [19]

Ishiguro

[11] Patent Number: 4,814,810

[45] Date of Patent: Mar. 21, 1989

[54] ACTIVE-TYPE AUTO-FOCUSING MECHANISM

[75] Inventor: Minoru Ishiguro, Omiya, Japan

[73] Assignee: Fuji Photo Optical Co., Ltd., Omiya, Japan

[21] Appl. No.: 114,486

[22] Filed: Oct. 28, 1987

[30] Foreign Application Priority Data

Mar. 24, 1987 [JP]  Japan .................................. 62-70018

[51] Int. Cl.⁴ ................................................ G03B 3/00
[52] U.S. Cl. ........................................ 354/403; 356/1; 356/4
[58] Field of Search ...................... 354/403; 356/1, 4; 250/201 AF

[56] References Cited

U.S. PATENT DOCUMENTS

| | | | |
|---|---|---|---|
| 4,592,637 | 6/1986 | Suda | 354/403 |
| 4,621,917 | 11/1986 | Kaneda | 354/403 |
| 4,674,855 | 6/1987 | Utagawa | 354/403 |
| 4,710,011 | 12/1987 | Ushiro | 354/403 |
| 4,716,430 | 12/1987 | Stauffer | 354/403 |
| 4,717,819 | 1/1988 | Momiyama et al. | 356/4 X |

Primary Examiner—W. B. Perkey
Attorney, Agent, or Firm—Jordan and Hamburg

[57] ABSTRACT

An active-type autofocusing mechanism includes a light projector for projecting a light beam from a light source toward an object. A photo detector arrangement includes separate position-sensitive photo detectors disposed with equal spacing in opposite direction with respect to the light projector. A processor is connected to the photodetector arrangement for calculating the distance to the object.

1 Claim, 4 Drawing Sheets

ACTIVE-TYPE AUTO-FOCUSING MECHANISM

BACKGROUND OF THE INVENTION

1. Field of the invention:

The present invention relates to an improved active-type auto-focusing mechanism which can measure the distance between an object and film surface without any failure in distance measurement due to any partial reflection at the object or incorrect light beam projection from the light source.

2. Description of the Prior Art:

Recently, auto-focusing mechanisms have been developed for use in, for example, cameras, etc. to automatically measure the distance between an object or objects and a film surface. Various types of such auto-focusing mechanism have been proposed. The present invention utilizes the principle of trigonometric distance measurement in the auto-focusing mechanism. The trigonometric distance-measurement will be first described below.

The trigonometric distance-measurement is schematically shown in FIG. 1. As seen, a light beam is projected from a light source 6 to an object 4 through a light-projection lens 8. The light beam reflected at the object 4 is made incident upon a photo detector 5 through a photo-detection lens 9. Since the base-line length B is predetermined, the distance between the light-projection lens 8 and object 4 can be measured by determining the deviation y of the incident beam spot from the optical axis a in the photo-detection plane or photo detector 5. That is a simple geometry can be used to determine the distance L from the photo-detection lens 8 to the object 4 based on the similitude between the triangles AOC and ECD. This can be expressed as follows:

$$L = (B/y) \cdot CE \qquad (a)$$

where
CE: Distance between photo-detection lens and plane
B = AC: Base length

These values CE, B and AC are predetermined. Therefore, if the deviation y is known in the expression (a), the distance L can be determined.

Next, a camera incorporating an auto-focusing mechanism which can automatically measure a distance between an object and film surface under the above-mentioned principle, will be described. As shown in FIGS. 1 and 2, such camera has a finder 105 on opposite sides of which a light projector 1 and photo detector 2 are provided, respectively. A beam of, for example, infrared rays or the like is projected from the light projector 1 toward the object 4 and the infrared beam reflected at the object 4 is incident upon the photo detector 2. For detection of the above-mentioned incident infrared beam, the photo detector 2 is of an active-type auto-focusing mechanism using a position-sensitive device which utilizes the lateral photo effect on the semiconductor surface (will be referred to as "PSD type" hereinafter), position-sensitive element on which a predetermined pattern of light shields is provided (will be referred to as "pattern type" hereinafter), or the like.

In case of the pattern type system, the photo detector 2 is composed, as shown, for example, in FIG. 3, of a reference photo-detection element 10 disposed in the image plane of the photo-detection lens 9' and intended for canceling the reflection factor of the object, and a position-sensitive photo-detection element 11 disposed in the image plane of the photo-detection lens 9 and having on the photo-detection surface thereof an aluminum-made wedge-like light shield which detects the position of the reflected light beam from the object. By determining the ratio in light amount between the position-sensitive and reference photo-detection elements 11 and 10, the position of the incident beam spot F can be detected irrespectively of the reflection factor of the object.

Since the base-line length is the data indispensable for the distance measurement and depends upon the position of the incident beam spot F, it is important to accurately detect the position of the incident beam spot F.

Generally, the light beam has a circular section and is projected toward the object so that the incident beam upon the photo detector has also a circular section. As shown in FIG. 3, the Y-directional distance $y_2$ between the central position M(end point) in the photo detection plane of the beam spot F and an arbitrary point(base point) on the optical axis is determined as the correct base length.

In practice, however, even if the light beam of a circular section is projected toward the object, it may possibly be incident upon the photo-detection plane of the reference and position-sensitive photo-detection elements 10 and 11, respectively, taking a distorted form losing the circularity when reflected at the object 4.

In case the section of the incident light beam is not circular as in the above, a processor provided calculates the center of mass of the incident beam spot based on its form in the photo-detection plane. The base-line length in the auto-focusing mechanism is so set as to be calculated taking the calculated center of mass as an end point. Thus, when the incident light beam F has a circular section, the center of mass may possibly deviate from the central position, resulting in an erroneous distance measurement.

In such conditions, if the diameter W of the projected light beam is large as shown in, for example, FIG. 4, the incident light beam has no circular section. The light beam reflected at the object has a noncircular section when incident upon the photo detector (will be referred to as "partial reflection" hereinafter), so that no accurate distance measurement is possible. So it is desirable to reduce the diameter of W of the projected light beam as much as possible.

However, if the diameter of the projected light beam is made small, the measuring range is limited correspondingly. For example, in case two objects standing side by side are photographed while viewing the middle between them, the light beam will pass through between them as shown with ϵ in FIG. 4 and go further to the background at the back of the objects (this will be referred to as "incorrect reflection" hereinafter). In this case, it is not possible to get any in-focus photo-graph of the objects.

SUMMARY OF THE INVENTION

The present invention has an object to overcome the abovementioned drawbacks of the conventional techniques by providing an improved active-type auto-focusing mechanism in which a lightbeam of a larger diameter is projected from the light source, thereby preventing any incorrect projection of the light beam between the objects and also preventing erroneous distance measurement due to partial reflection of the light beam at the objects.

The object of the present invention can be attained by providing an auto-focusing mechanism comprising, according to the present invention, a light projector having a light projection lens to project the light from a light source toward an object, a photo detector disposed at a predetermined distance from the light projector and which has a photo-detection lens to make the reflected light beam from the object be incident upon photo-detection elements of the photo detector, and a processor to calculate the distance between the object and film surface based on a photo current produced corresponding to the amount of the light incident upon the photo-detection elements. There is further provided at least a photo detector at the different position of the above-mentioned photo-detection. This photo detector calculates the photo currents delivered from the photo-detection elements of these plural photo detectors, thereby preventing any erroneous distance measurement due to any incorrect projection of light beam or partial reflection of the projected light beam.

The active-type auto-focusing mechanism according to the present invention comprises plural photo detectors. In other words, the mechanism is provided with plural position sensitive optical systems. The reflected light beam from the object is detected by the photo detectors at the plural positions and the detected positions of the incident light beam at the plural positions are averaged to sense the position of the object, so that any deviation of the object's position from the optical axis in a direction perpendicular (which will be referred to as "lateral direction" hereinafter) to the optical axis of the light beam projected from the light projector toward the object can be followed with a high accuracy. Also according to the present invention, the incident light beam is detected at the plural positions, so that even if the light beam projected from the light projector is not so much limited, the distance can be measured with a high accuracy, following precisely any deviation of the object from the optical axis.

These and other objects and advantages of the present invention will be better understood from the ensuing description made by way of example of the embodiments according to the present invention with reference to the accompanying drawings.

DETAILED DESCRIPTION OF THE PREFERRED EMBODIMENTS

Figure 5:
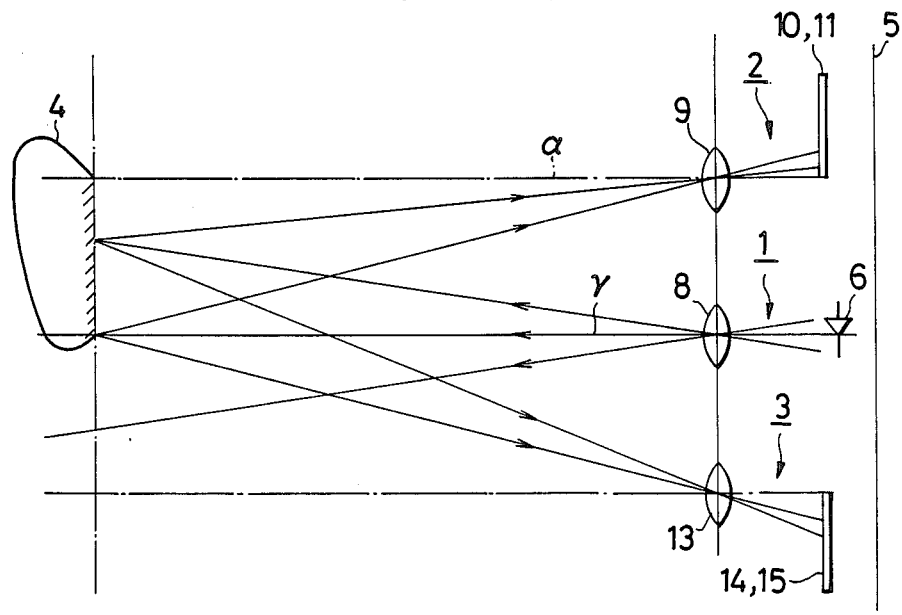
FIG. 5 is a schematic illustration of the active-type auto-focusing mechanism according to the present invention.

FIG. 5 shows the active-type auto-focusing mechanism according to the present invention. This active-type auto-focusing mechanism is intended for position detection of incident light beam, called the pattern type. The mechanism comprises a light projector 1, first and second photo detectors 2 and 3 disposed on the opposite sides of the light projector 1, and a processor (not shown). The reference numeral 4 indicates an object and 5 a film surface. The active-type autofocusing mechanism according to the present invention is not limited only to the pattern type as in this embodiment, but it may be a PSD type.

The light projector 1 projects a light of a certain wavelength toward the object. In this embodiment, the light projector comprises an infrared LED 6 and light-projection lens 8. The light projection lens 8 is a convex lens or the like to project a converged infrared beam from the infrared LED 6 toward the object 4.

Figure 6:
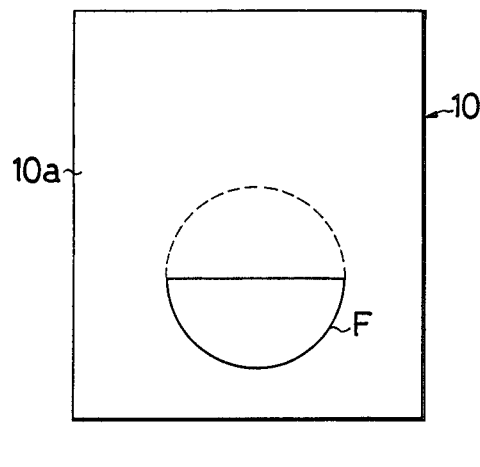
FIGS. 6 to 9 are explanatory drawings, respectively, of a first reference photo detector, first distance measuring photo detector, second reference photo detector and second distance-measuring photo detector used in the active-type auto-focusing mechanism according to the present invention.
Figure 7:
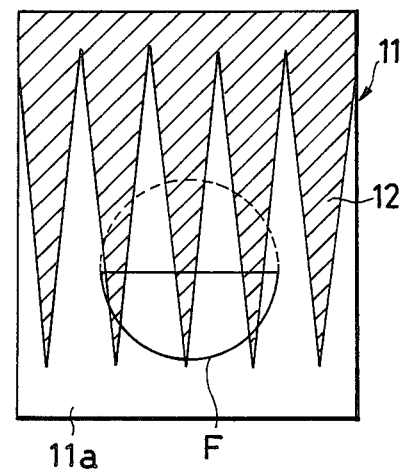

The first photo detector 2 is provided to receive the light reflected at the object 4 and which has been projected from the light projector 1 to provide a first beam spot in the photo-detection plane. In this embodiment, the first photo detector 2 comprises a first photo-detection lens 9, first reference photo-detection element 10 and first position-sensitive photo-detection element 11. The first photo-detection lens 9 is a convex lens or the like disposed parallel to the film surface 5 as spaced the base length B from the optical axis γ of the light-projection lens 8 and with the optical axis α being parallel to the optical axis γ of the light-projection lens 8. The first reference photo-detection element 10 is provided to standardize the amount of the incident light. This photo-detection element 10 is so constructed as to produce a photo current $I_{A1}$ in response to a light of a certain wavelength, namely, the infrared beam in this embodiment. Since the first reference photo-detection element 10 has a photo-detection plane 10a of which the upper portion lies far from the light projector 1 as shown in FIG. 6, when the reflected light from the object 4 in, for example, a position shown in FIG. 5 is incident upon the photo-detection element 10, a beam spot F of which an upper portion far from the light projector 1 is missing is formed in the photo-detection lane 10a. The first position-sensitive photo-detection element 11 is provided to determine from the incident light amount a position thereof on the first position-sensitive photo-detection element 11. As shown in FIG. 7, the photo-detection element 11 consists of a flat substrate on which aluminum or the like is evaporated to form a light shield 12 of a predetermined pattern, namely, wedge pattern. When the above-mentioned infrared beam is incident upon it, the photo-detection element 11 produces a photo current $I_{B1}$. Similarly to the first reference photo-detection element 10, the first position-sensitive photo-detection element 11 has a photo-detection plane 11a of which the upper portion is far from the light projector 1, so that a beam spot F of a same shape as in the first reference photo-detection element 10 is formed in the photo-detection plane 11a. These first reference photo-detection element 10 and first position-sensitive photo-detection element 11 are disposed integrally with each other in this embodiment, but it will be apparent that they may be juxtaposed.

Figure 1:
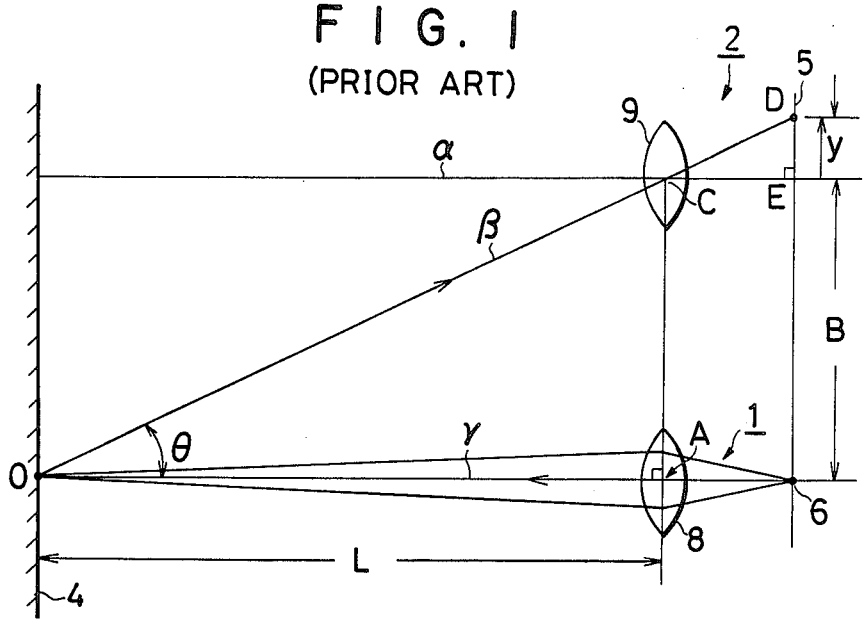
FIG. 1 an explanatory schematic illustration of the principle of trigonometric distance measurement constituting the principle of the active-type auto-focusing.
Figure 2:
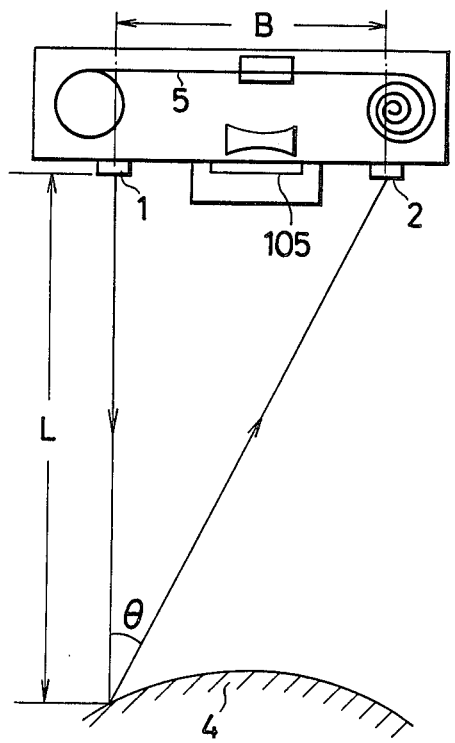
FIG. 2 is also an explanatory drawing showing a conventional active type auto-focusing mechanism utilizing the above-mentioned principle of trigonometric distance measurement.
Figure 3:
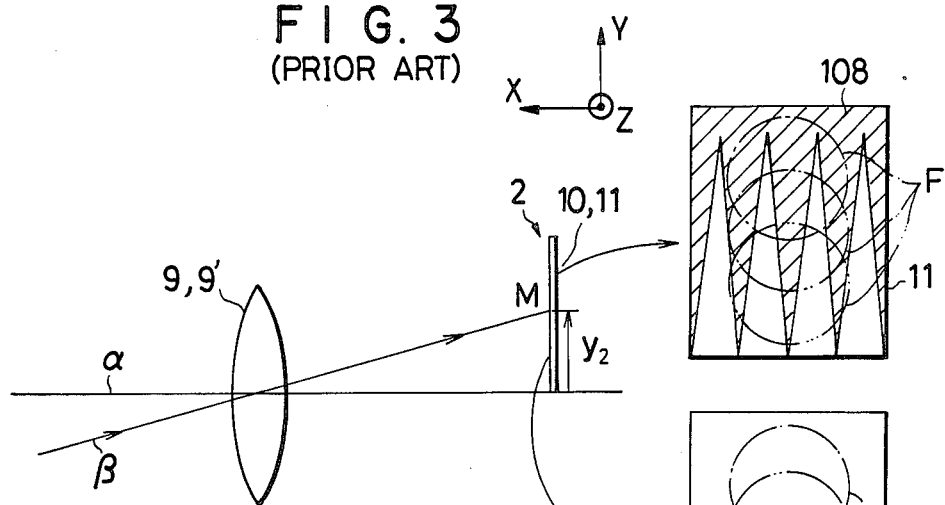
FIG. 3 is an explanatory drawing showing a photo detector used in the conventional active-type auto-focusing mechanism.
Figure 4:
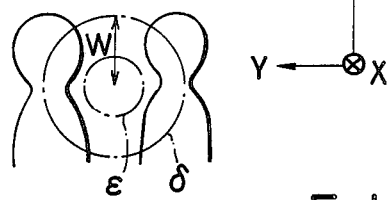
FIG. 4 is an explanatory drawing of the conventional active-type auto-focusing mechanism showing its drawbacks.
Figure 8:
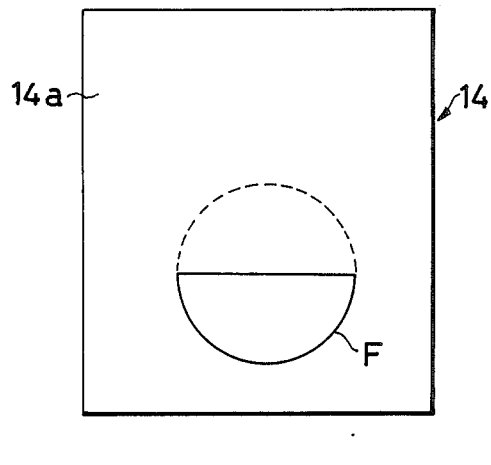
Figure 9:
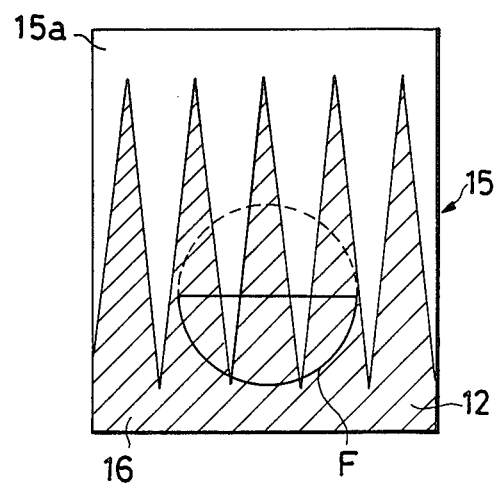

The second photo detector 3 is provided to receive the light projected from the light projector 1 and reflected by the object 4 at an opposite position to the first photo detector 2 with reference to the photo projector 1, and to produce a second beamspot in the photo-detection plane. This second photo detector 3 comprises, similar to the first photo detector 2, a second photo-detection lens 13, second reference photo-detection element 14 and a second position-sensitive photo-detection element 15. The second photo-detection lens 13 is a convex lens or the like disposed symmetrically with the first photo-detection lens 9 with respect to the light-projection lens 8. The second reference photo-detection element 14 is identical to the first photo-detection element 10 as shown in FIG. 8. When receiving a light of a certain wavelength, namely, the above-mentioned infrared beam, the second reference photo-detection element 14 produces a photo current $I_{A2}$. Further, the second reference photo detector 14 has a photo-detection plane 14a of which the upper portion is near the light projector 1 as shown in FIG. 8, so that when the reflected light from the object 4 in, for example, a position shown in FIG. 1 is incident, a beam spot of which an upper portion near the light projector 1 is missing is formed in the photo-detection plane 14a. Also, the second position-sensitive photo-detection element 15 has a light shield 16 disposed symmetrically with the light projector 1, namely, in a portion far away from the light projector 1. Receiving the above-mentioned infrared beam, it produces a photo current $I_{B2}$. The second position-sensitive photo-detection element 15 has a photo-detection plane 15a of which an upper portion is near the light-projector 1, as shown in FIG. 9. Therefore, there is produced in the photo-detection plane 15a a beam spot F of the same shape as on the second reference photo-detection element 14. The second reference photo-detection element 14 and second position-sensitive photo-detection element 15 are arranged integrally with each other, but in case the second reference photo-detection element 14 and second position-sensitive photo-detection element 15 at the side of the first photo detector 2 are as juxtaposed, those at the side of this second photo detector 3 should preferably be also disposed as juxtaposed.

Figure 10:
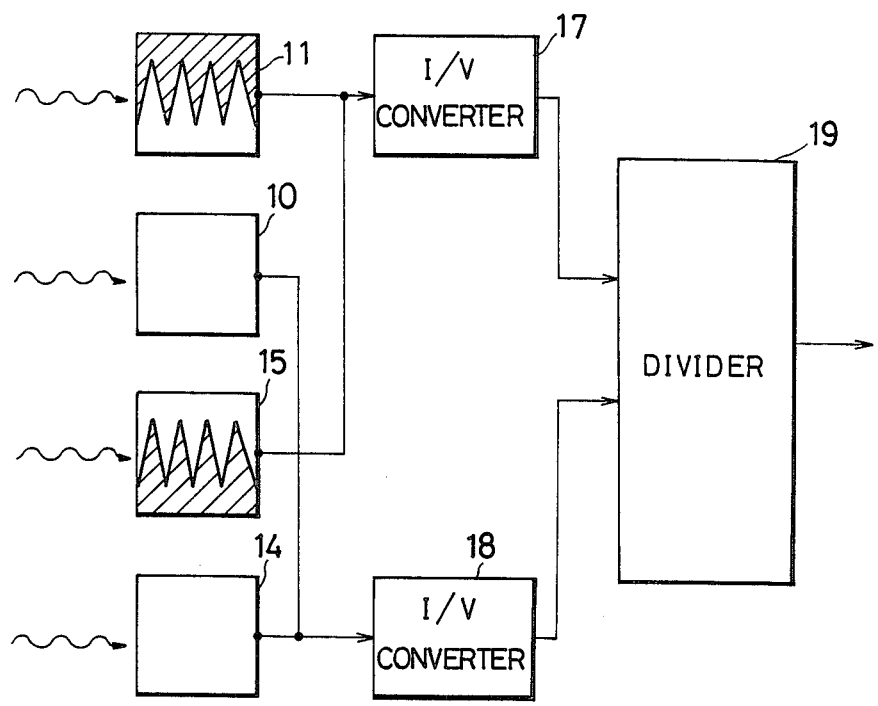
FIG. 10 is a block diagram showing the configuration of a processor according to the present invention.

The processor is provided to electrically measure the distance between an object and a film surface and based on the photo currents delivered from the first and second reference photo-detection elements 10 and 14, and from the first and second position-sensitive photo-detection elements 11 and 15. As shown in FIG. 10, the processor comprises a first I/V converter 17, second I/V converter 18 and a divider 19. The first I/V converter 17 has the input thereof connected to the outputs of the first and position-sensitive photo-detection elements 11 and 15, respectively, and adds together the photo currents $I_{B1}$ and $I_{B2}$ from these first and second position-sensitive photo-detection elements 11 and 15 to produce a voltage corresponding to the sum of the photo currents $I_{B1}+I_{B2}$. The second I/V converter 18 has the input thereof connected to the outputs of the first and second reference photo-detection elements 10 and 14, respectively, and adds together the photo currents $I_{A1}$ and $I_{A2}$ to produce a voltage corresponding to the sum of photo currents $I_{A1}$ and $I_{A2}$. The divider 19 is provided to divide the voltage value converted by the first I/V converter 17 by that converted by the second I/V converter 18, thereby producing a value concerning a distance measurement expression f(L) and which is necessary for a distance measurement which will be described later. The divider 19 has the input thereof connected to the outputs of the first and second I/V converters 17 and 18, respectively, and the output thereof connected to a control means (not shown) for driving the focusing lens, or the like.

Figure 11:
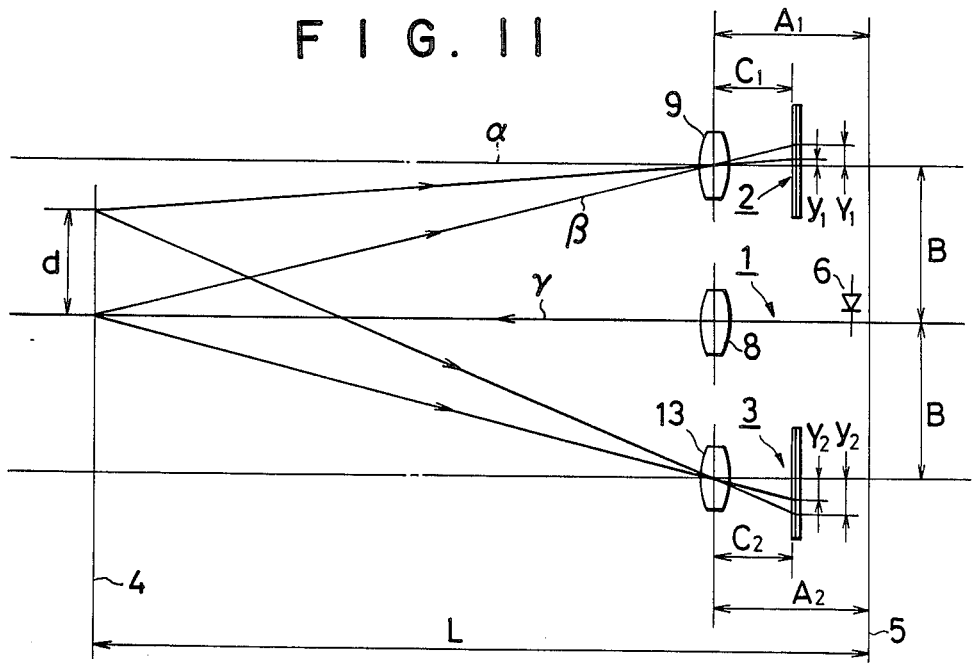
FIG. 11 is a diagram of light paths used to calculate the destance-measuring arithmethic expression utilized in the active-type auto-focusing mechanism according to the present invention.

Next, the distance measurement expression f(L) adopted in this embodiment will be calculated with reference to FIG. 11:

From the relation in similitude proportion, the following is derived:

$$y_1/C_1=(B-d)/(B-A_1) \therefore y_1=[(B-d)/(L-A_1)]\cdot C_1 \quad (1)$$

$$Y_1/C_1=B/(L-A_1) \therefore Y_1=[B/(L-A_1)]\cdot C_1 \quad (2)$$

$$y_2/C_2=(B+d)/(L-A_2) \therefore y_2=[(B+d)/(L-A_2)]\cdot C_2 \quad (3)$$

$$Y_2/C_2=B/(L-A_2) \therefore Y_2=[B/(L-A_2)]\cdot C_2 \quad (4)$$

Assume here that the distances from the film surface 5 to the first and second poto-detection lenses 9 and 13, respectively, are equal to each other and these lenses 9 and 13 are identical in lens properties (focal length, etc.) to each other. The following results.

$$A_1=A_2\equiv A, C_1=C_2\equiv C$$

From the expressions (2) and (4), the following is derived:

$$Y_1=Y_2=]B/(L-A)]\cdot C$$

From the expression (1), the following is derived:

$$y_1=[(B-d)/(L-A)]\cdot C \quad (1)'$$

Similarly, from the expression (3), the following is derived:

$$y_2=[(B+d)/(L-A)]\cdot C \quad (3)'$$

In the above, A, B and C are predetermined constants, and so the position of the beam spot is univocally determined.

Under the assumption that the ratios between photo currents produced correspondingly to the deviation between the beam spots incident upon the reference and distance measurement photo-detection elements of the first and second photo detectors 2 and 3, respectively, are taken as $\alpha_1$ and $\alpha_2$, respectively, the following results:

$$I_{B1}(y_1)/I_{A1}(y_1)=\alpha y_1,$$

$$I_{B2}(y_2)/I_{A2}(y_2)=\alpha y_2.$$

Assume that the first and second distance measurement photodetection elements 11 and 15 are identical in photoelectrical-conversion properties to each other, the following is derived:

$$\alpha_1=\alpha_2\equiv\alpha$$

Under the assumption that $I_{A1}(y_1)=I_{A2}(y_2)\equiv I_A$, the following result:

$$I_{B1}(y_1)=\alpha y_1 \cdot I_A, \quad I_{B2}(y_2)=\alpha y_2 \cdot I_A$$

Therefore, the ratio S between the sum of photo currents from the reference photo-detection elements of the first and second photo detectors 2 and 3 with the sum of photo currents from the position-sensitive photo-detection elements is as follows:

$$\begin{aligned} S &= [I_{B1}(y_1) + I_{B2}(y_2)]/[I_{A1}(y_1) + I_{A2}(y_2)] \\ &= [I_{B1}(y_1) + I_{B2}(y_2)]/2I_A \\ &= \frac{\alpha(y_1 + y_2)}{2} \\ &= \frac{\alpha}{2} \cdot \frac{C(B-d)}{L-A} + \frac{C(B+d)}{L-A} \\ &\quad \text{(from the expression (1)' and (3)')} \\ &= \frac{\alpha BC}{L-A} \\ &\equiv f(L) \end{aligned}$$

Since the constants $\alpha$, A, B and C are predetermined, it is apparent that the ratio in sum of photo current between the position-sensitive photo-detection elements and reference photo-detection elements of the first and second photo detectors 2 and 3, respectively, is a function f(L) determined by L, not by y.

Thus, the following distance measurement expression is derived:

$$f(L)=\alpha BC/(L-A)$$

If the value of the function f(L), namely, the ratio in photo current, is known, the value L can be determined.

Therefore, in the active-type auto-focusing mechanism according to the present invention, even if the spot light emitted from, for example, the light projector 1 is projected as partially missing to the object 4, the first and second photo detectors 2 and 3 produce photo currents $I_{A1}$ and $I_{A2}$, and $I_{b1}$ and $I_{B2}$, respectively, corresponding to the deviated positions of the beam spots incident upon the photo detectors. The photo currents are supplied to the processor where they are subject to a predetermined process based on the aforementioned distance measurement expression to calculate the distance L between the film surface 5 and the object 4.

What is claimed is:

1. An active-type auto-focusing mechanism, comprising:

a light projector having a light projection lens for projecting light from a light source toward an object;

a photo detector having a plurality of position sensing devices, disposed at predetermined distances from the light projector and positioned to receive the projected light beam reflected from the object, and to produce photo currents corresponding to the amount and intensity of the light received thereby; and a processor for receiving the photo currents produced by said position sensing devices, and calculating the distance between the object and film surface based on said photo currents;

said position sensing devices being comprised of first and second position sensing devices each having position-sensitive photo-detection elements disposed at predetermined equal distances in mutually opposite directions from, and centered with respect to, said light projector;

said processor comprising means for summing the amplitudes of the photo currents produced by each position sensing device, thereby preventing erroneous distance measurement caused by incorrect projections, partial reflection of the light beam or movement of the object.

* * * * *